(12) United States Patent
Walgren et al.

(10) Patent No.: US 8,246,825 B2
(45) Date of Patent: Aug. 21, 2012

(54) HORIZONTAL FILTER STAGE WITH SIMULTANEOUS VENTING AND DRAINING

(75) Inventors: Timothy P. Walgren, Rockford, IL (US); Paul E. Honkanen, Williams Bay, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 752 days.

(21) Appl. No.: 12/176,459

(22) Filed: Jul. 21, 2008

(65) Prior Publication Data

US 2010/0012574 A1  Jan. 21, 2010

(51) Int. Cl.
 B01D 35/30 (2006.01)
 B01D 35/00 (2006.01)
 B01D 35/28 (2006.01)
 F02M 37/22 (2006.01)
 B01D 27/00 (2006.01)

(52) U.S. Cl. ........ 210/248; 210/232; 210/435; 210/436; 210/437; 210/440; 210/443; 210/450; 210/451; 210/453; 210/472

(58) Field of Classification Search ................... 210/232, 210/248, 453; 220/366.1, 367.1, 368
See application file for complete search history.

(56) References Cited

U.S. PATENT DOCUMENTS

| 5,928,511 A * | 7/1999 | Messner et al. ............... 210/248 |
| 6,610,203 B1 * | 8/2003 | Jainek ........................... 210/248 |
| 2001/0037969 A1 * | 11/2001 | Stankowski ................... 210/348 |

* cited by examiner

*Primary Examiner* — Benjamin Kurtz
(74) *Attorney, Agent, or Firm* — Stephen G. Mican

(57) ABSTRACT

A filter assembly for filtering particulate contaminants from a fluid comprises: a generally cylindrical filter unit with one end closed and the other end open; a filter head comprising a generally cylindrical sleeve extending generally horizontally an open end for receiving the open end of the filter unit with that has a vent port aligned with a vertical axis through an upper portion of the sleeve and a drain port aligned with the vertical axis extending through a lower portion of the sleeve; and a coupling for securing the open end of the filter unit to the filter head to seal the sleeve vent and drain ports; wherein loosening the coupling allows the filter unit to slide away from the filter head sufficiently to establish fluid communication between the sleeve vent and drain ports.

20 Claims, 2 Drawing Sheets

HORIZONTAL FILTER STAGE WITH SIMULTANEOUS VENTING AND DRAINING

GOVERNMENT RIGHTS STATEMENT

The development of this invention involved government support under Contract Number N00019-04-C-0093 awarded by the United States Navy. The government has certain rights in the invention.

FIELD OF THE INVENTION

The invention relates to fluid supply and distribution systems, and more particularly to filtering assemblies for fluid distribution systems.

BACKGROUND OF THE INVENTION

Fluid distribution systems for aerospace applications, such as fuel or lubrication oil supply and distribution systems, generally require a filtration stage to remove particulate contaminants from the fluid. Because of space limitations, it is common for the filtration stage to comprise a filter assembly integrated with a fluid delivery pump. Such a filter assembly comprises a filter head attached to the pump and a removable filter unit that attaches to the filter head. The removable filter unit generally comprises a filter bowl and a disposable filter element therein.

Particularly in aerospace applications, it is often desirable for the filter unit to mount to the filter head in a horizontal orientation due to space constraints. Unfortunately, removal of the filter unit from the filter head then results in spillage of fluid remaining in the filter unit or draining from the filter head.

SUMMARY OF THE INVENTION

The invention generally comprises a filter assembly for filtering particulate contaminants from a fluid comprising: a generally cylindrical filter unit with one end closed and the other end open with a generally circular first fluid port and a generally annular second fluid port in a coaxial arrangement; a filter head comprising a generally circular fluid interface aligned along a generally horizontal axis with a generally circular first fluid port and a generally annular second fluid port in a coaxial arrangement to mate with the corresponding filter unit first and second fluid ports and further comprising a generally cylindrical sleeve extending generally horizontally from the interface with an open end for receiving the open end of the filter unit with a vent port aligned with a vertical axis horizontally displaced from the interface extending through an upper portion of the sleeve and a drain port aligned with the vertical axis extending through a lower portion of the sleeve; and a coupling for securing the open end of the filter unit to the filter head interface to seal the sleeve vent and drain ports and mate the corresponding first and second fluid ports of the filter unit and filter head to establish fluid communication between them; wherein loosening the coupling allows the filter unit to slide away from the filter head interface sufficiently to establish fluid communication between the sleeve vent and drain ports and the fluid ports in the filter unit and filter head.

DETAILED DESCRIPTION OF THE INVENTION

Figure 1:
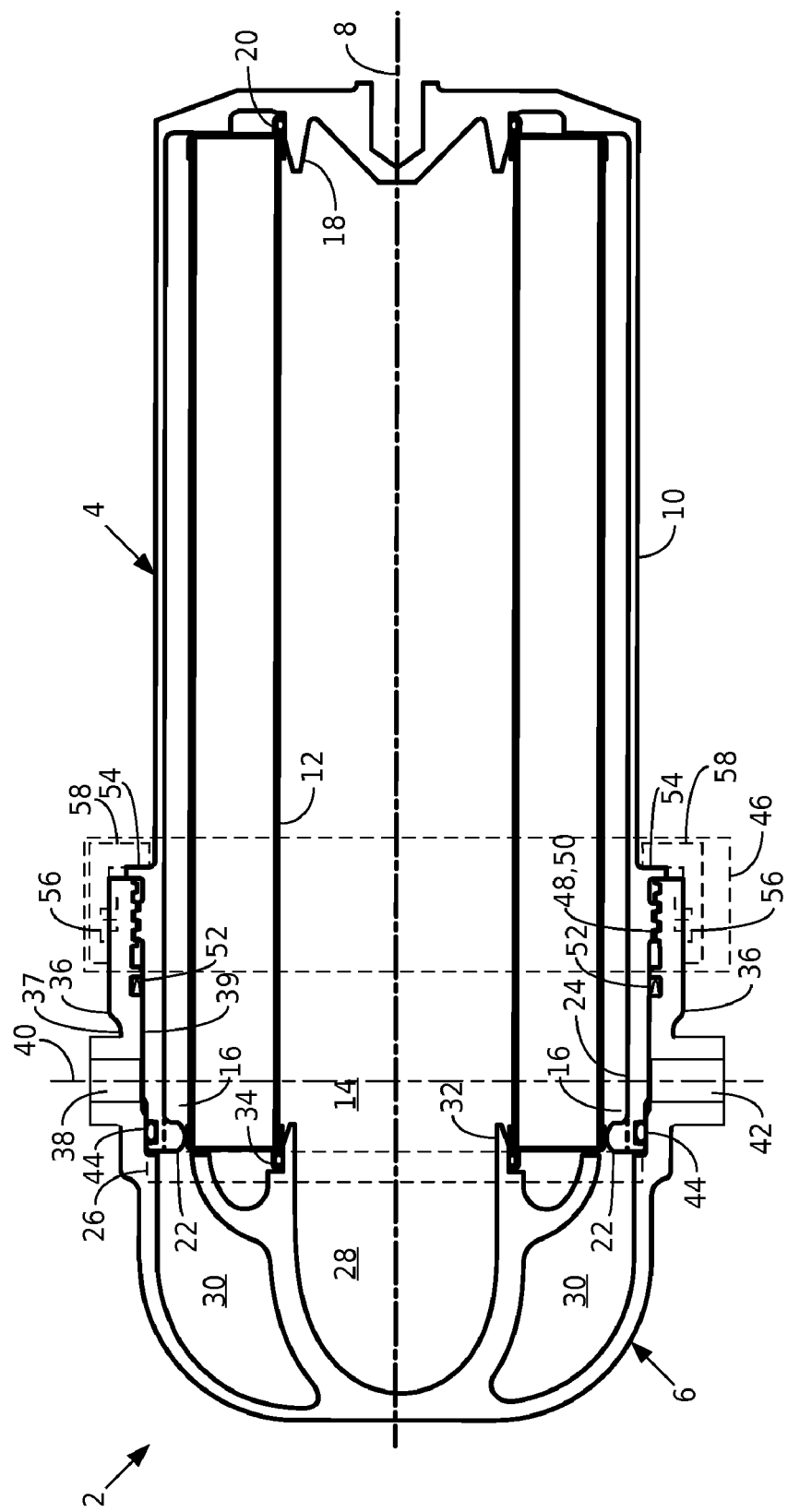
FIG. 1 is a cut-away side view of a filter assembly according to a possible embodiment of the invention with its filter unit in a normal position.

FIG. 1 is a cut-away side view of a filter assembly 2 according to a possible embodiment of the invention. The filter assembly 2 comprises a generally cylindrical filter unit 4 and a filter head 6 aligned along a generally horizontal axis 8. The filter unit 4 may comprise a filter bowl 10 with one end closed and the other end open. The filter unit 4 may also comprise a generally cylindrical filter element 12 that mounts in the filter bowl 10. The open end of the filter unit 4 has a generally circular first fluid port 14 and a generally annular second fluid port 16 in coaxial alignment with the horizontal axis 8.

The filter element 12 may be a replaceable and disposable element that the filter bowl 10 receives through its open end. The filter unit first fluid port 14 may comprise an axial void within the filter element 12. The filter unit second fluid port 16 may comprise a cylindrical void between the filter element 12 and the filter bowl 10. The filter element 12 engages an annular bowl flange 18 within the closed end of the filter bowl 10 to seal the filter element 12 to the closed end of the filter bowl 10. A packing seal or gasket 20, such as an O-ring, may facilitate sealing of the filter element 12 to the closed end of the filter bowl 10. Multiple protrusions 22 along an inner surface 24 of the filter bowl 10 proximate its open end may facilitate alignment of the filter element 12 and prevent rotation of the filter element 12 within the filter bowl 10.

The filter head 6 comprises a generally circular filter head fluid interface 26 with a generally circular first fluid port 28 and a generally annular second fluid port 30 in coaxial alignment with the horizontal axis 8. The filter head first fluid port 28 mates with the filter unit first fluid port 14 and the filter head second fluid port 30 mates with the filter unit second fluid port 16. The filter element 12 engages an annular interface flange 32 that protrudes from the interface 26 to seal the filter head first fluid port 28 to the filter unit first fluid port 14. A packing seal or gasket 34, such as an O-ring, may facilitate sealing of the filter head first fluid port 28 to the filter unit first fluid port 14.

The filter head 6 also comprises a generally cylindrical sleeve 36 that extends generally horizontally from the interface 26 with an open end that receives the open end of the filter unit 4. The sleeve 36 comprises a vent port 38 aligned with a vertical axis 40 that is horizontally displaced from the interface 26 that extends through an upper portion of the sleeve 36 from its outer surface 37 to its inner surface 39 and a drain port 42 aligned with the vertical axis that extends through a lower portion of the sleeve 36 from its outer surface 37 to its inner surface 39. An annular packing seal 44 proximate the open end of the filter unit 4 horizontally positioned between the interface 26 on one side and the filter head sleeve vent port 38 and drain port 42 on the other may seal these ports from the open end of the filter unit 4 as well as sealing the entire filter assembly 2.

The filter assembly 2 also comprises a coupling 46 for securing the open end of the filter unit 4 to the filter head 6 to seal the sleeve vent port 38 and the sleeve drain port 42 as well as sealing the entire filter assembly 2 and mate the filter unit first fluid port 14 to the filter head first fluid port 28 and the filter unit second fluid port 16 to the filter head second fluid port 30. The coupling 46 may comprise a threaded section 48 on a portion of the filter unit 4 that mates with a threaded section 50 on a portion of the filter head sleeve 36, with these threaded sections horizontally positioned between the vent port 38 and drain port 42 on one side and the open end of the sleeve 36 on the other side. An annular scraping seal 52 between the filter unit 4 and the filter head sleeve 36 horizontally positioned between the vent port 38 and the drain port 42 on one side and the filter unit threaded section 48 and the sleeve threaded section 50 on the other side may reduce fluid and fluid contaminants from entering these threaded sections upon fluid drainage and removal of the filter unit 4 from the filter head 6.

Alternatively, the coupling 46 may comprise an annular flange 54 on the filter unit 4 that engages the open end of the filter head sleeve 36, a threaded section 56 of the sleeve adjacent its open end and a threaded coupling nut, sleeve or ring 58 that engages the filter unit flange 54 and mates with the threaded sleeve section 56 to secure the open end of the filter unit 4 to the filter head 6. In this case, since the threads of the threaded sleeve section 56 and coupling ring 58 are external, the annular scraping seal 52 may be optional. Further, the coupling 46 may be a bolted flange, retaining ring, flange clamp, or any other such coupling device.

Figure 2:
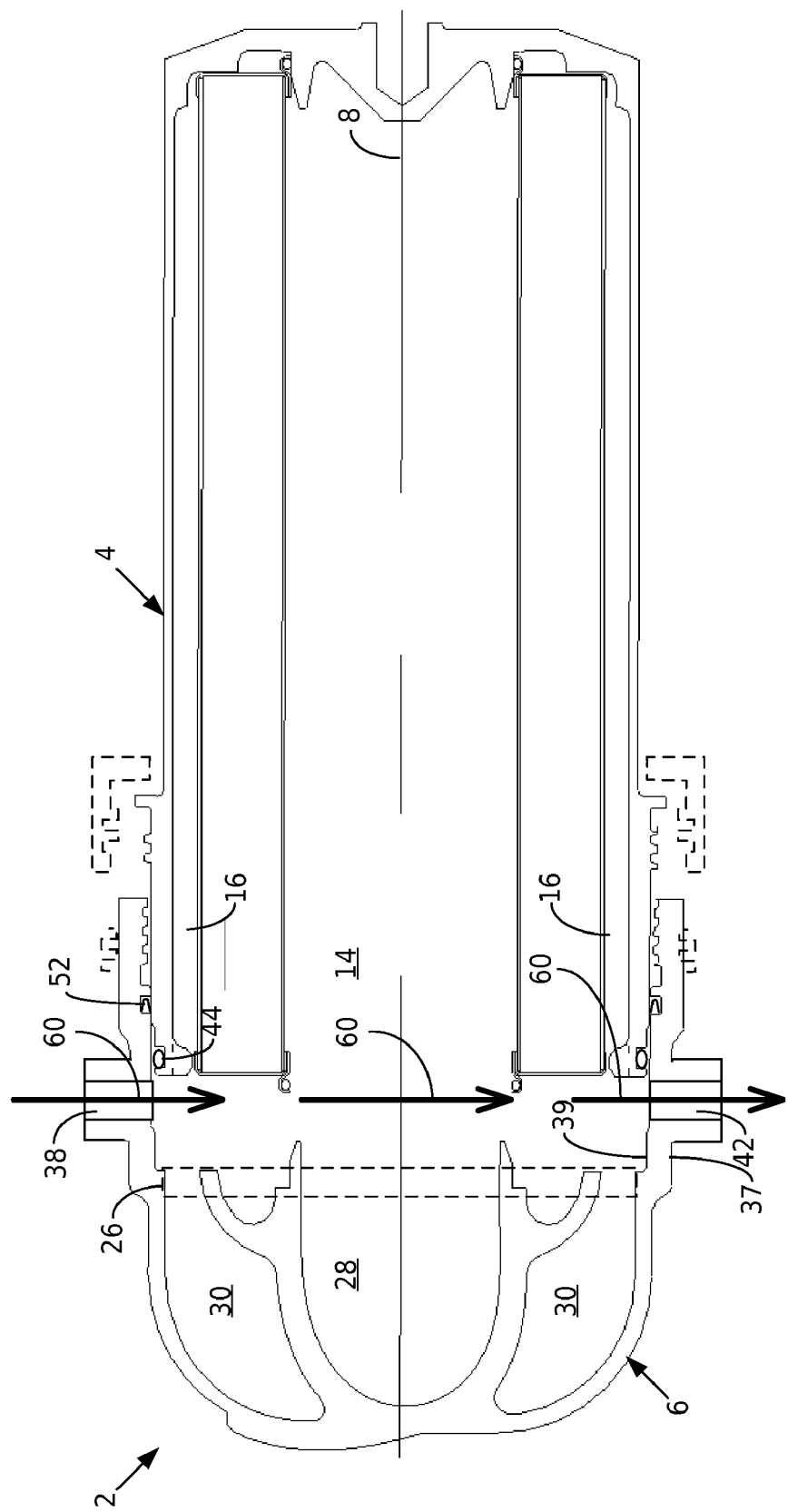
FIG. 2 is a cut-away side view of a filter assembly according to a possible embodiment of the invention with its filter unit in a partially withdrawn position for fluid drainage.

FIG. 2 is a cut-away side view of the filter assembly 2 according to a possible embodiment of the invention with its filter unit 4 in a partially withdrawn or draining position from the filter head 6 for fluid drainage. Loosening the coupling 46 allows the filter unit 4 to slide away from the filter head 6 sufficiently to establish fluid communication between the sleeve vent port 38, the sleeve drain port 42, the filter unit first fluid port 14, the filter unit second fluid port 16, the filter head first fluid port 28, the filter head second fluid port 30, and most cavities within the filter head 6 and the filter unit 4. This operation allows venting and draining in a single operation and may provide for remote fluid drainage collection. The vent port 38 may be useful for both venting and flushing purposes. Arrows 60 show the possible fluid flow path in this draining position. The vent port 38 may terminate at the top of the sleeve 36 or it may wrap around the filter head 6 and terminate at the drain port 42 to collect any fluid drainage from the vent port 38 as well. After complete draining of fluid from the vent port 38 and drain port 42, the complete removal of the filter unit 4 from the filter head 6 is possible with no fluid spillage.

The described embodiments of the invention are only some illustrative implementations of the invention wherein changes and substitutions of the various parts and arrangement thereof are within the scope of the invention as set forth in the attached claims.

The claimed invention is:

1. A filter assembly for filtering particulate contaminants from a fluid, comprising:
   a generally cylindrical filter unit with one end closed and the other end open with a generally circular first fluid port and a generally annular second fluid port in a coaxial arrangement;
   a filter head comprising a generally circular fluid interface aligned along a generally horizontal axis with a generally circular first fluid port and a generally annular second fluid port in a coaxial arrangement to mate with the corresponding filter unit first and second fluid ports and further comprising a generally cylindrical sleeve extending generally horizontally from the interface that has an outer surface, an inner surface, an open end for receiving the open end of the filter unit, a vent port aligned with a vertical axis horizontally displaced from the interface extending through an upper portion of the sleeve from its outer surface to its inner surface and a drain port aligned with the vertical axis extending through a lower portion of the sleeve from its outer surface to its inner surface; and
   a coupling for securing the open end of the filter unit to the filter head sleeve to seal the sleeve vent and drain ports and mate the corresponding first and second fluid ports of the filter unit and filter head to establish fluid communication between them;
   wherein loosening the coupling allows the filter unit to slide away from the filter head sufficiently to establish fluid communication between the sleeve vent and drain ports along the vertical axis and the fluid ports in the filter unit and filter head.

2. The filter assembly of claim 1, wherein the cylindrical filter unit comprises a generally cylindrical filter element that mounts in a filter bowl with an axial void along the horizontal axis that serves as the first fluid port and a cylindrical void between the filter element and the filter bowl that serves as the second fluid port.

3. The filter assembly of claim 2, wherein the filter bowl receives the filter element through the open end of the filter unit and the axial void of the filter element engages an annular bowl flange within the closed end of the filter bowl to seal the axial void of the filter element to the closed end of the filter bowl.

4. The filter assembly of claim 3, further comprising a gasket that seals the annular void of the filter element to the annular bowl flange.

5. The filter assembly of claim 3, wherein the filter bowl comprises multiple protrusions along an inner surface proximate the open end of the filter unit to align the filter element and prevent its rotation within the filter bowl.

6. The filter assembly of claim 1, wherein the filter head interface comprises an annular interface flange to seal the first filter head fluid port to the first filter unit fluid port.

7. The filter assembly of claim 6, further comprising a gasket that seals the first filter head fluid port to the first filter unit fluid port.

8. The filter assembly of claim 1, further comprising an annular packing seal proximate the open end of the filter unit horizontally positioned between the filter head interface and the filter head sleeve vent and drain ports to seal the open end of the filter unit from the filter head sleeve vent and drain ports.

9. The filter assembly of claim 1, wherein the coupling comprises mating threaded sections of the filter unit and the filter head sleeve horizontally positioned between the vent and drain ports and the open end of the filter head sleeve.

10. The filter assembly of claim 9, further comprising an annular scraping seal between the filter unit and the filter head sleeve horizontally positioned between the sleeve vent and drain ports and the threaded sections of the filter unit and the filter head sleeve.

11. The filter assembly of claim 1, wherein the coupling comprises an annular flange on the filter unit that engages the open end of the filter head sleeve, a threaded section of the filter head sleeve adjacent the open end of the filter head sleeve and a threaded coupling ring that engages the filter unit flange and mates with the threaded sleeve section to secure the open end of the filter unit to the filter head.

12. A filter assembly for filtering particulate contaminants from a fluid, comprising:
   a generally cylindrical filter unit with one end closed and the other end open with a generally circular first fluid port and a generally annular second fluid port in a coaxial arrangement;

a filter head comprising a generally circular fluid interface aligned along a generally horizontal axis with a generally circular first fluid port circumscribed by an annular interface flange and a generally annular second fluid port in a coaxial arrangement to mate with the corresponding filter unit first and second fluid ports, the annular interface flange sealing the filter head first fluid port to the filter unit first fluid port, and further comprising a generally cylindrical sleeve extending generally horizontally from the interface that has an outer surface, an inner surface, an open end for receiving the open end of the filter unit, a vent port aligned with a vertical axis horizontally displaced from the interface extending through an upper portion of the sleeve from its outer surface to its inner surface and a drain port aligned with the vertical axis extending through a lower portion of the sleeve from its outer surface to its inner surface; and a coupling comprising mating threaded sections of the filter unit and the filter head sleeve horizontally positioned between the vent and drain ports and the open end of the filter head sleeve for securing the open end of the filter unit to the filter head interface to seal the sleeve vent and drain ports and mate the corresponding first and second fluid ports of the filter unit and filter head to establish fluid communication between them;

wherein loosening the coupling allows the filter unit to slide away from the filter head sufficiently to establish fluid communication between the sleeve vent and drain ports along the vertical axis and the fluid ports in the filter unit and filter head.

13. The filter assembly of claim 12, wherein the cylindrical filter unit comprises a generally cylindrical filter element that mounts in a filter bowl with an axial void along the horizontal axis that serves as the first fluid port and a cylindrical void between the filter element and the filter bowl that serves as the second fluid port.

14. The filter assembly of claim 13, wherein the filter bowl receives the filter element through the open end of the filter unit and the axial void of the filter element engages an annular bowl flange within the closed end of the filter bowl to seal the axial void of the filter element to the closed end of the filter bowl.

15. The filter assembly of claim 14, further comprising a gasket that seals the annular void of the filter element to the annular bowl flange.

16. The filter assembly of claim 14, wherein the filter bowl comprises multiple protrusions along an inner surface proximate the open end of the filter unit to align the filter element and prevent its rotation within the filter bowl.

17. The filter assembly of claim 12, further comprising a gasket that seals the first filter head fluid port to the first filter unit fluid port.

18. The filter assembly of claim 12, further comprising an annular packing seal proximate the open end of the filter unit horizontally positioned between the filter head interface and the filter head sleeve vent and drain ports to seal the open end of the filter unit from the filter head sleeve vent and drain ports.

19. The filter assembly of claim 12, further comprising an annular scraping seal between the filter unit and the filter head sleeve horizontally positioned between the sleeve vent and drain ports and the threaded sections of the filter unit and the filter head sleeve.

20. A filter assembly for filtering particulate contaminants from a fluid, comprising:

a generally cylindrical filter unit with one end closed and the other end open comprising a generally cylindrical filter element that mounts in a filter bowl with an axial void along the horizontal axis that serves as a first fluid port and a cylindrical void between the filter element and the filter bowl that serves as a second fluid port in a coaxial arrangement with the first fluid port, wherein the filter bowl receives the filter element through the open end of the filter unit and the axial void of the filter element engages an annular bowl flange within the closed end of the filter bowl to seal the filter element to the closed end of the filter bowl and multiple protrusions along an inner surface proximate the open end of the filter unit align the filter element and prevent its rotation within the filter bowl;

a filter head comprising a generally circular fluid interface aligned along a generally horizontal axis with a generally circular first fluid port circumscribed by an annular interface flange and a generally annular second fluid port in a coaxial arrangement to mate with the corresponding filter unit first and second fluid ports, the annular interface flange sealing the filter head first fluid port to the filter unit first fluid port, and further comprising a generally cylindrical sleeve extending generally horizontally from the interface that has an outer surface, an inner surface, an open end for receiving the open end of the filter unit, a vent port aligned with a vertical axis horizontally displaced from the interface extending through an upper portion of the sleeve from its outer surface to its inner surface and a drain port aligned with the vertical axis extending through a lower portion of the sleeve from its outer surface to its inner surface; and a coupling comprising mating threaded sections of the filter unit and the filter head sleeve horizontally positioned between the vent and drain ports and the open end of the filter head sleeve for securing the open end of the filter unit to the filter head interface to seal the sleeve vent and drain ports and mate the corresponding first and second fluid ports of the filter unit and filter head to establish fluid communication between them;

wherein loosening the coupling allows the filter unit to slide away from the filter head interface sufficiently to establish fluid communication between the sleeve vent and drain ports along the vertical axis and the fluid ports in the filter unit and filter head.

\* \* \* \* \*